US012006727B2

(12) United States Patent
Stendal

(10) Patent No.: US 12,006,727 B2
(45) Date of Patent: Jun. 11, 2024

(54) LOCKING DEVICE WITH A MECHANICAL ARRANGEMENT FOR SELECTING AN ACTIVE SIDE OF A DOOR

(71) Applicant: STENDALS EL AB, Västerås (SE)

(72) Inventor: David Stendal, Bromma (SE)

(73) Assignee: STENDALS EL AB, Västerås (SE)

( * ) Notice: Subject to any disclaimer, the term of this patent is extended or adjusted under 35 U.S.C. 154(b) by 493 days.

(21) Appl. No.: 17/270,136

(22) PCT Filed: Aug. 22, 2019

(86) PCT No.: PCT/SE2019/050771
§ 371 (c)(1),
(2) Date: Feb. 22, 2021

(87) PCT Pub. No.: WO2020/040688
PCT Pub. Date: Feb. 27, 2020

(65) Prior Publication Data
US 2021/0238883 A1 Aug. 5, 2021

(30) Foreign Application Priority Data
Aug. 23, 2018 (SE) .................................... 1851004-0

(51) Int. Cl.
*E05B 13/00* (2006.01)
*E05B 63/00* (2006.01)
(Continued)

(52) U.S. Cl.
CPC ............ *E05B 13/005* (2013.01); *E05B 63/04* (2013.01); *E05B 63/16* (2013.01); *E05C 1/002* (2013.01);
(Continued)

(58) Field of Classification Search
CPC ........ E05B 13/005; E05B 63/16; E05B 63/08; E05B 13/103; E05B 13/105; E05B 59/00;
(Continued)

(56) References Cited

U.S. PATENT DOCUMENTS 1,682,521 A * 8/1928 Huttemann ............. E05B 63/16
292/170
3,361,462 A * 1/1968 Foster ..................... E05B 55/00
70/462
(Continued)

FOREIGN PATENT DOCUMENTS

AU 717917 B2 4/1998
DE 20300394 U1 4/2003
(Continued)

*Primary Examiner* — Christine M Mills
*Assistant Examiner* — Faria F Ahmad
(74) *Attorney, Agent, or Firm* — Dilworth & Barrese, LLP

(57) ABSTRACT

The present invention relates to a locking device with arrangement for selecting an active side of a door, the locking device comprising —a first side configured to face a first side of a door and a second side configured to face a second side of a door when the locking device is mounted in the door, —a bolt that is configured to move between an extended position and a retracted position, said movement being in a direction parallel to the first side and the second side, and —a bolt operating mechanism configured to control a position of the bolt, and the arrangement comprising —a first handle receiving portion arranged on the first side of the locking device, and configured to rotate when a first handle is operated, —a second handle receiving portion arranged on the second side of the locking device, and configured to rotate when a second handle is operated, wherein the first handle receiving portion and the second handle receiving portion are configured to move independently of each other; the arrangement also comprising —a
(Continued)

Figure 1:
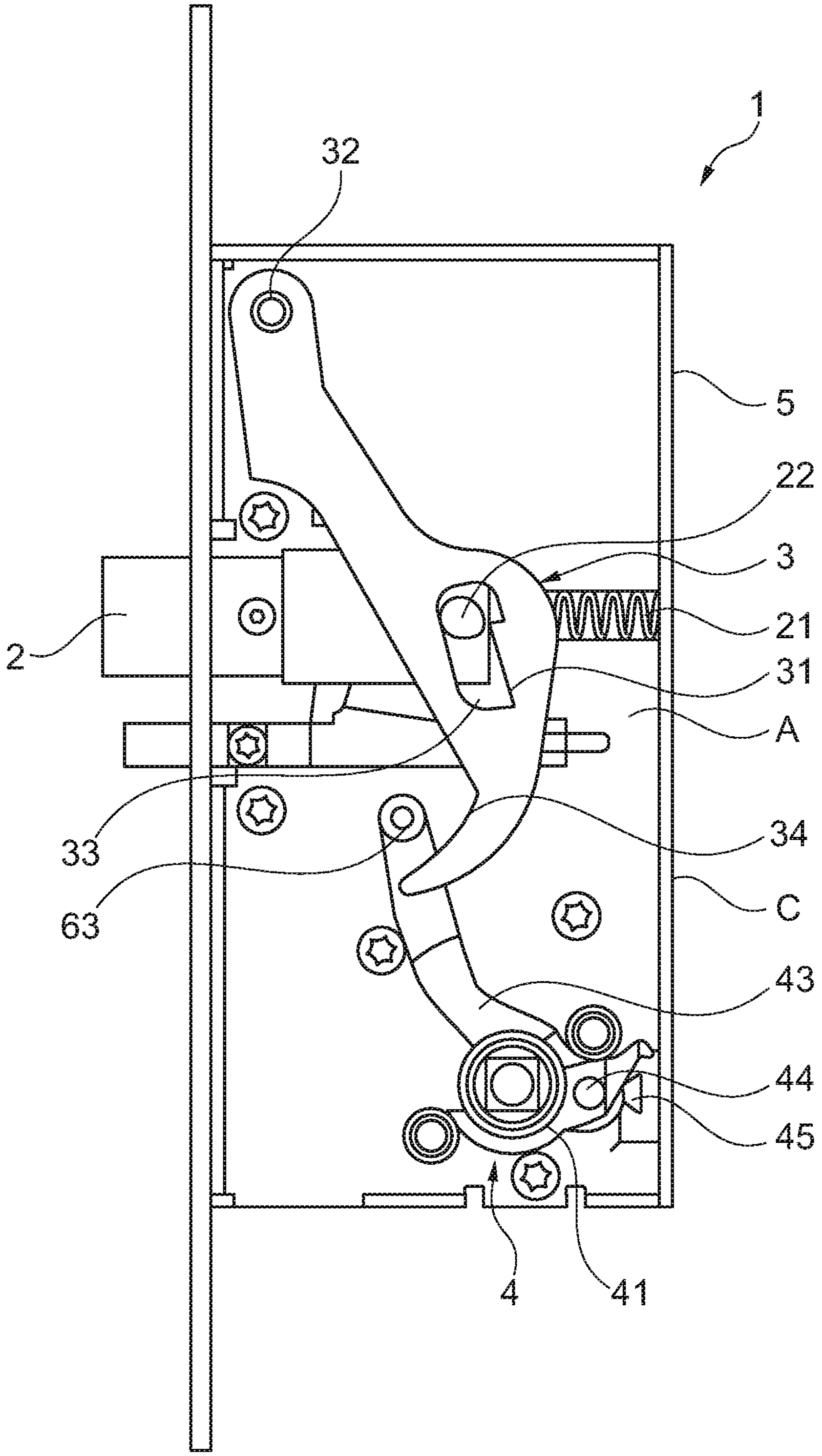

connector configured to transmit a movement from the first handle receiving portion or the second handle receiving portion to the bolt operating mechanism of the locking device; —an actuator movable from a first position, in which it connects the first handle receiving portion to the connector to a second position in which it connects the second handle receiving portion to the connector, so that a rotation of the first handle receiving portion or second handle receiving portion is configured to generate a movement of the bolt; —and a fastening device configured to fixate the actuator in the first position or the second position, —wherein the fastening device is configured to be accessible from a third side of the locking device, said third side being essentially perpendicular to the first and second side.

13 Claims, 7 Drawing Sheets

(51) Int. Cl.
*E05B 63/04* (2006.01)
*E05B 63/08* (2006.01)
*E05B 63/16* (2006.01)
*E05C 1/00* (2006.01)
*E05C 1/06* (2006.01)

(52) U.S. Cl.
CPC ............ *E05C 1/06* (2013.01); *E05B 63/0065* (2013.01); *E05B 63/08* (2013.01)

(58) Field of Classification Search
CPC ........ E05B 55/06; E05B 63/20; E05B 63/044; E05B 63/0065; E05B 13/101; E05B 15/0033; E05B 15/004; E05B 63/04; E05B 63/042; E05C 1/002; E05C 1/06; E05C 1/163; Y10T 292/0839; Y10T 70/5226; Y10T 292/0834; Y10T 292/096; Y10T 292/0837; Y10T 292/0977; Y10T 292/0982; Y10T 70/5239; Y10T 292/59; Y10T 70/5478; Y10T 70/5394; Y10T 70/5805; Y10T 70/5832; Y10S 292/27; Y10S 292/26; Y10S 292/37; Y10S 292/65
See application file for complete search history.

(56) References Cited

U.S. PATENT DOCUMENTS 3,361,464 A * 1/1968 Foster .................. E05B 63/044 292/165
4,071,270 A * 1/1978 Alexander ............. E05B 59/00 292/169.22
4,589,691 A * 5/1986 Foshee .................... E05B 63/16 292/DIG. 61
4,974,883 A * 12/1990 Jans ........................ E05C 1/163 292/169.14
5,044,184 A * 9/1991 Herbers .................. E05B 9/084 70/370
5,474,348 A * 12/1995 Palmer ................ E05B 47/0669 292/144
5,678,870 A * 10/1997 Pelletier .................. E05B 55/12 292/169.16
5,896,764 A 4/1999 Monsch et al.
6,581,423 B2 * 6/2003 Lin ......................... E05B 55/06 70/486
6,619,705 B2 * 9/2003 Dalsing ................... E05B 55/06 292/169.14
6,622,535 B2 * 9/2003 Chiang ............... E05B 47/0692 70/277
6,978,646 B2 * 12/2005 Raatikainen ........ E05B 47/0688 292/336.3
7,497,486 B1 * 3/2009 Davis .................. E05B 15/0205 292/169.14
8,292,336 B2 * 10/2012 Moon ..................... E05B 63/04 70/462
8,371,627 B2 * 2/2013 Chiang ............... E05B 63/0065 292/164
8,419,086 B2 * 4/2013 Moon ..................... E05B 55/00 292/108
9,262,875 B1 * 2/2016 Chen ................... E05B 47/0673
9,803,395 B2 * 10/2017 Chen ....................... E05B 63/08
11,214,982 B2 * 1/2022 Raatikainen ............ E05B 53/00
11,408,207 B2 * 8/2022 Liu ....................... E05B 15/022
2004/0089040 A1 * 5/2004 Raatikainen ........ E05B 47/0688 70/283
2007/0051143 A1 3/2007 Raatikainen et al.
2007/0114800 A1 * 5/2007 Kuo ...................... E05B 63/044 292/244
2010/0052339 A1 * 3/2010 Chen ..................... E05B 13/004 292/244
2010/0225123 A1 * 9/2010 Chiang ............... E05B 15/0013 292/1.5
2010/0225126 A1 * 9/2010 Chiang ................... A61P 31/14 292/164
2010/0263418 A1 * 10/2010 Moon ..................... E05B 63/16 292/61
2011/0006549 A1 * 1/2011 Lin ..................... E05B 15/0013 292/167
2011/0079057 A1 * 4/2011 Frolov ................ E05B 47/0673 70/91
2011/0203326 A1 * 8/2011 Lin ......................... E05B 63/16 70/1.5
2014/0042757 A1 * 2/2014 Chen ..................... E05B 13/005 292/341.15
2014/0075728 A1 * 3/2014 George ............... E05B 63/0065 29/401.1
2014/0175807 A1 * 6/2014 Lambrou ................ E05B 47/06 292/92
2014/0175810 A1 * 6/2014 Lambrou ............ E05B 47/0004 292/144
2014/0333073 A1 * 11/2014 Bartos ................. E05B 47/0673 292/32
2018/0320414 A1 * 11/2018 Piantek ..................... E05C 1/04
2019/0119962 A1 * 4/2019 Lien .................... E05B 47/0692
2020/0157847 A1 * 5/2020 Liu ......................... E05C 19/04
2020/0340271 A1 * 10/2020 Raatikainen ........ E05B 15/0033
2021/0348946 A1 * 11/2021 Chen ....................... E05B 47/00
2022/0034122 A1 * 2/2022 Holst-Larsen ...... E05B 47/0669
2022/0034126 A1 * 2/2022 Zhao ....................... E05B 63/08
2022/0056729 A1 * 2/2022 Lin ..................... E05B 47/0692
2022/0290475 A1 * 9/2022 Cheng ................. E05B 65/0811
2022/0372794 A1 * 11/2022 Holst-Larsen .......... E05B 63/16
2022/0381063 A1 * 12/2022 Liao .................... E05B 47/0012
2023/0061772 A1 * 3/2023 Chen ................... E05B 47/0012

FOREIGN PATENT DOCUMENTS

DE 20307120 U1 7/2003
DE 202009008432 U1 8/2009
EP 0537531 B1 6/1995
EP 0620341 B1 1/1998
EP 2264267 A2 12/2010
EP 2385199 A2 11/2011
EP 2855805 B1 4/2017
EP 2290180 B1 4/2018
WO 9728334 A1 8/1997
WO 2006039751 A1 4/2006
WO 2009008014 A1 1/2009
WO 2011072334 A1 6/2011

* cited by examiner

LOCKING DEVICE WITH A MECHANICAL ARRANGEMENT FOR SELECTING AN ACTIVE SIDE OF A DOOR

TECHNICAL FIELD

The present invention relates to a locking device with a mechanical arrangement for selecting an active side of a door, arrangement comprising a connector configured to connect either a first handle on a first side of the door or a second handle on a second side of the door to a bolt operating mechanism configured to control a position of the bolt.

BACKGROUND

Locking devices generally allow for opening doors by operating a door handle that is connected to a bolt so that a rotation of the handle results in a movement of the bolt. The connection between the handle and the bolt may be mechanical or electrical but in some cases it is for safety reasons necessary to have an entirely mechanical connection to ensure that the door can always be opened, such as the case where an emergency or a power shortage makes the electrical connection malfunction.

Generally, only one side of door needs to have this failsafe mechanical connection, so that persons inside a room or building can always get out but that entry into the room or building is limited. Locking devices may therefore be configured so that one side is always active, and when mounting a door a selection must be made as to which side should be active so that a corresponding locking device can be selected. This has the drawback, however, that two mirror-image versions of the locking device must be kept at hand so that the most suitable can be selected for each door and depending on whether the door opens to the left or to the right.

To resolve this problem, there are some prior art solutions that disclose a locking device where the active side can be selected through manipulating the locking device to connect one of the handles to the bolt before mounting, for instance through loosening a screw, adjusting the device and fastening the screw to fixate the device in a new configuration. Although this does indeed solve the problem above, it creates the drawbacks that the selection is cumbersome and requires tools to open the casing of the locking device and to manipulate the device itself, and also that this manipulation may be possible for unauthorized persons to perform during use by damaging the door to gain access to the locking device. There is also a risk that the means used for fixating the locking device in the desired configuration may break, resulting in a situation where the connection between the bolt and either of the handles is broken so that the door is impossible to open at all.

There is therefore a need for an improved locking device with arrangement for selecting an active side of a door that overcomes these drawbacks.

SUMMARY OF THE INVENTION

The object of the present invention is to eliminate or at least to minimize the problems mentioned above. This is achieved through a locking device with an arrangement for selecting an active side of a door according to the description herein. Particularly advantageous features of the present invention are set out in the description herein.

Thus, the present invention provides a locking device having a first side configured to face a first side of a door and a second side configured to face a second side of a door when the locking device is mounted in the door, with a bolt that is configured to move between an extended position and a retracted position, said movement being in a direction parallel to the first side and the second side, and a bolt operating mechanism configured to control a position of the bolt.

The arrangement for selecting an active side of the door comprises a first handle receiving portion arranged on the first side of the locking device, and configured to rotate when a first handle is operated, a second handle receiving portion arranged on the second side of the locking device, and configured to rotate when a second handle is operated, wherein the first handle receiving portion and the second handle receiving portion are configured to move independently of each other; and a connector configured to transmit a movement from the first handle receiving portion or the second handle receiving portion to the bolt operating mechanism of the locking device. The arrangement also comprises an actuator movable from a first position, in which it connects the first handle receiving portion to the connector to a second position in which it connects the second handle receiving portion to the connector, so that a rotation of the first handle receiving portion or second handle receiving portion is configured to generate a movement of the bolt; and a fastening device configured to fixate the actuator in the first position or the second position, wherein the fastening device is configured to be accessible from a third side of the locking device, said third side being essentially perpendicular to the first and second side.

This has the particular advantage that the fastening device and the actuator are separate components, so that damaging the fastening device through rough handling, wear and tear or potential sabotage of the door will not result in damages to the actuator. The risk of the locking device becoming stuck in a state where neither side of the door is active is thereby eliminated.

An additional advantage lies in the fastening device being placed in such a way that it is accessible only from a third side of the locking device, that third side being a side opposite to the side from which the locking bolt extends. Thereby, it is not possible to gain access to the fastening device by damaging the door by drilling or the like, rendering the locking device safe from manipulation by unauthorized persons when the locking device is in use.

According to an aspect of the invention, the actuator is a pin and the first handle receiving portion, second handle receiving portion and the connector each comprise a through hole, said through holes being aligned to form a channel in which the pin is movably arranged. Thereby, the actuator is securely held and easily able to move along the channel to effect the change from the first position to the second position. Also, the pin can be made from a strong and durable material and thanks to the avoidance of threads or the like on the surface of the pin, the material is not weakened in such a way that it would be susceptible to damaging or breaking. Compared to a screw, a pin of the same dimensions has a significantly improved tensile strength and can be subjected to significantly higher shearing forces without breaking. This could otherwise be a risk where a handle is operated with excessive force.

According to another aspect of the invention, the channel has a first length L and the pin has a second length l, said second length l being smaller than the first length L so that the pin in the first position rests in the through holes of the first handle receiving portion and the connector but not in the through hole of the second handle receiving portion, and so that the pin in the second position rests in the through holes of the second handle receiving portion and the connector but not in the through hole of the first handle receiving portion. Thereby, the first and second positions can be clearly defined and the movement of the pin between them can be performed in a stable and reliable way.

According to a further aspect of the invention, the channel has closed ends configured to prevent the pin from leaving the channel, the closed ends preferably being formed by end portions of the channel having a smaller diameter than a diameter of the pin. Thereby, the actuator is prevented from falling out of the channel at its ends. In one embodiment, the closed ends could alternatively be formed by a casing or housing of the locking device abutting the channel ends so that the housing itself prevents the actuator from escaping the channel.

According to another aspect of the invention, at least one of the closed ends comprises an inspection opening for determining the position of the pin. Thereby, a user can determine the position of the pin without needing to dismantle the locking device, giving the advantages both of immediately ascertaining which side of the locking device is active and of confirming that a desired change of position has been made before securing the pin in a new position.

According to a further aspect of the invention, there is a third position of the actuator in which neither the first handle receiving portion nor the second handle receiving portion is connected to the actuator, said third position being between the first and second positions. Thereby, the locking device can be brought to a state where no side is active so that only electrical connections can be made between the handles and the bolt.

According to yet another aspect of the invention, the pin comprises at least one cavity or groove into which the fastening device extends when fixating the pin. Preferably, the pin comprises one cavity or groove for each of the positions. Thereby, the first, second and possibly third position can be more precisely defined and any slippage of the pin during use can be avoided.

According to a further aspect of the invention, the fastening device is configured to fixate the actuator by a holding force against the actuator, said holding force being essentially perpendicular to a direction from the first position of the actuator to the second position of the actuator. Thereby, movements of the actuator can be prevented so that the force applied by the fastening device serves only to fixate and not to urge a movement in either direction along the channel.

According to yet another aspect of the invention, the fastening device is a screw and the holding force is created by the screw having an external thread configured to cooperate with an internal thread of a hole in which the screw is arranged. Thereby, the loosening and tightening of the fastening device can be performed in a controlled way and a sufficiently large force against the actuator created so that any undesired movement of the actuator is prevented.

According to a further aspect of the invention, the fastening device is a spring and the holding force is created by the spring being biased towards the actuator. Thereby, the actuator is securely held in place and the magnitude of the holding force can be determined by selecting a spring with the corresponding biasing force.

According to yet another aspect of the invention, the locking device further comprises a housing for holding the locking device and the arrangement, said housing having an opening on the third side in which the fastening device is inserted. Thereby, the locking device is protected and each component held in place, while at the same time giving access to the fastening device without having to open up the housing. This is especially advantageous during mounting when the active side is to be selected and where opening up the housing and dismantling the locking device is both time consuming and risky in that the position of some of the components may be inadvertently altered so that the locking device is not able to function in the desired way after mounting.

According to still another aspect of the invention, the housing has at least one inspection opening for determining a position of the actuator. Thereby, the position of the actuator can be determined without opening the housing, giving the benefits discussed above.

Many additional benefits and advantages of the invention will become readily apparent to the person skilled in the art in view of the detailed description below.

DRAWINGS

Figure 2A:
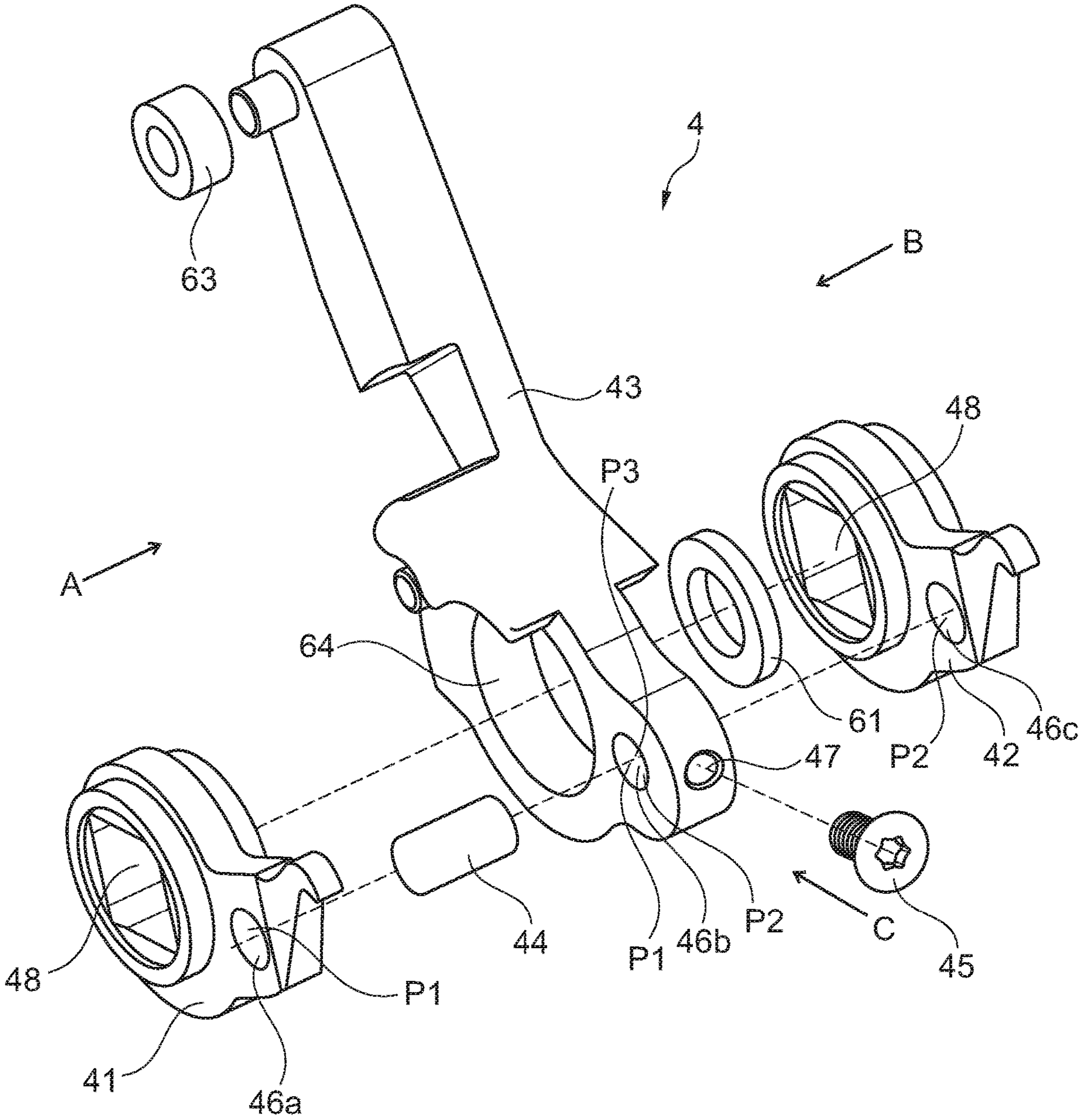
Figure 2B:
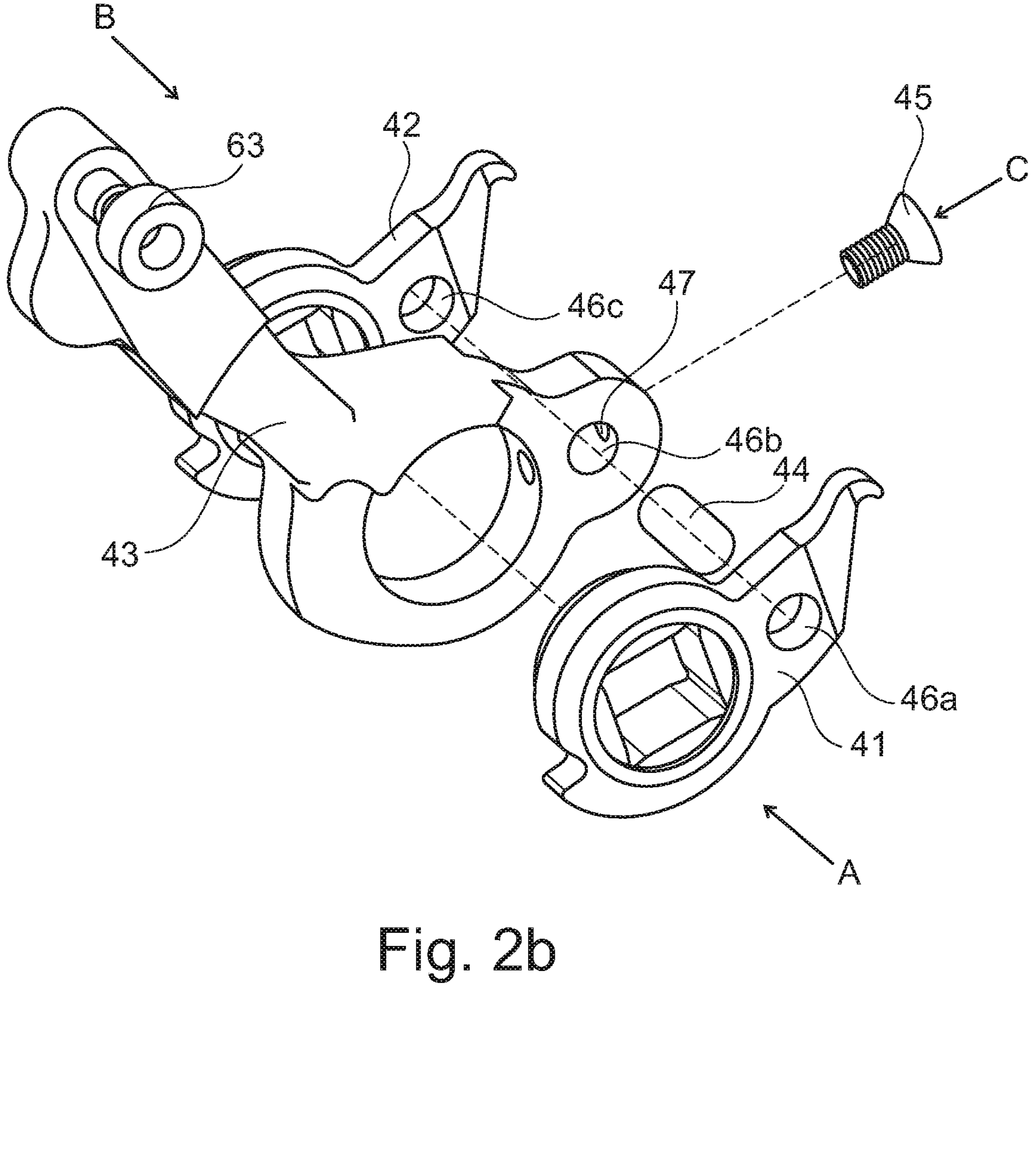
Figure 3A:
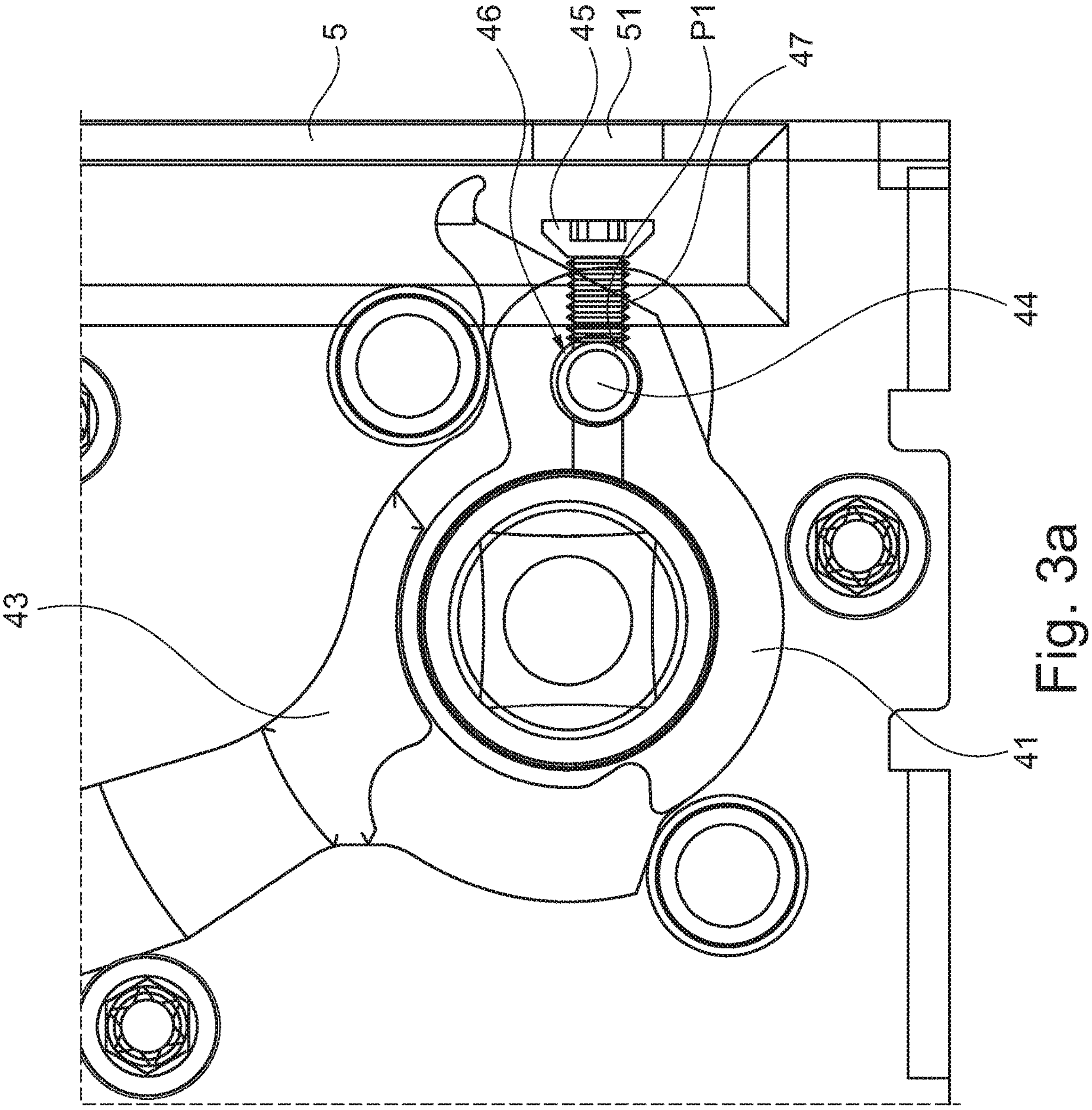
Figure 3B:
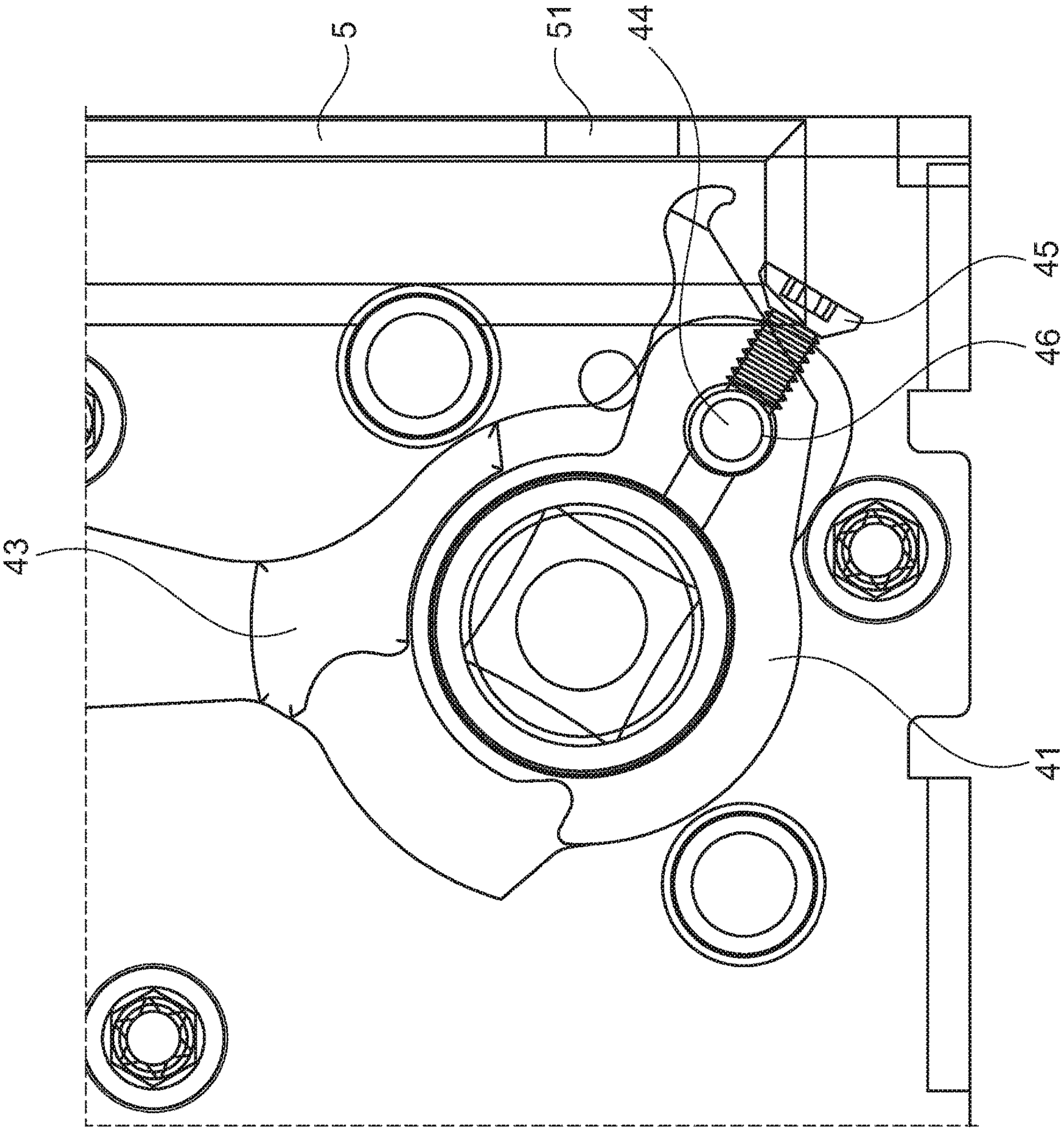
Figure 3C:
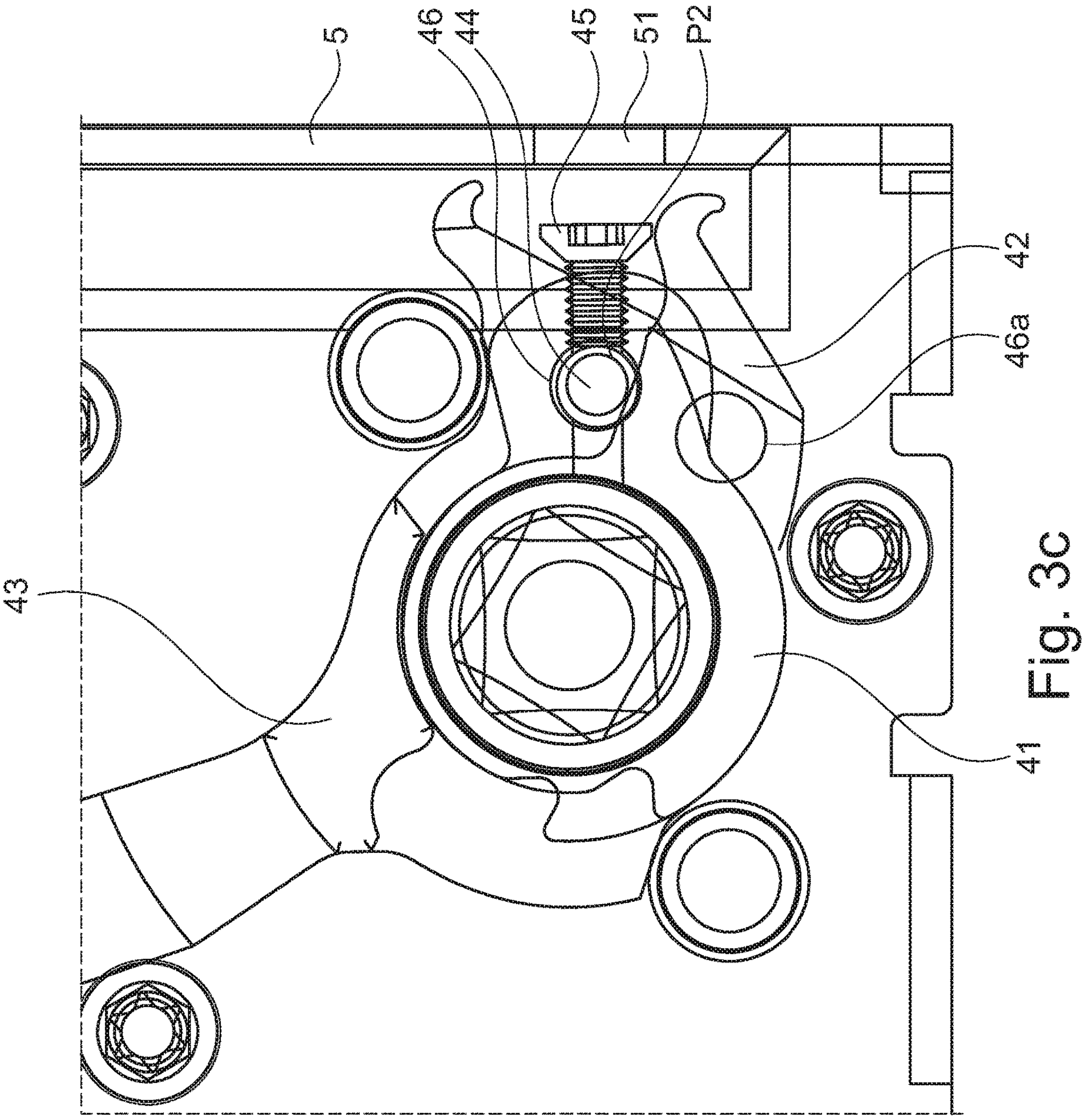
Figure 4:
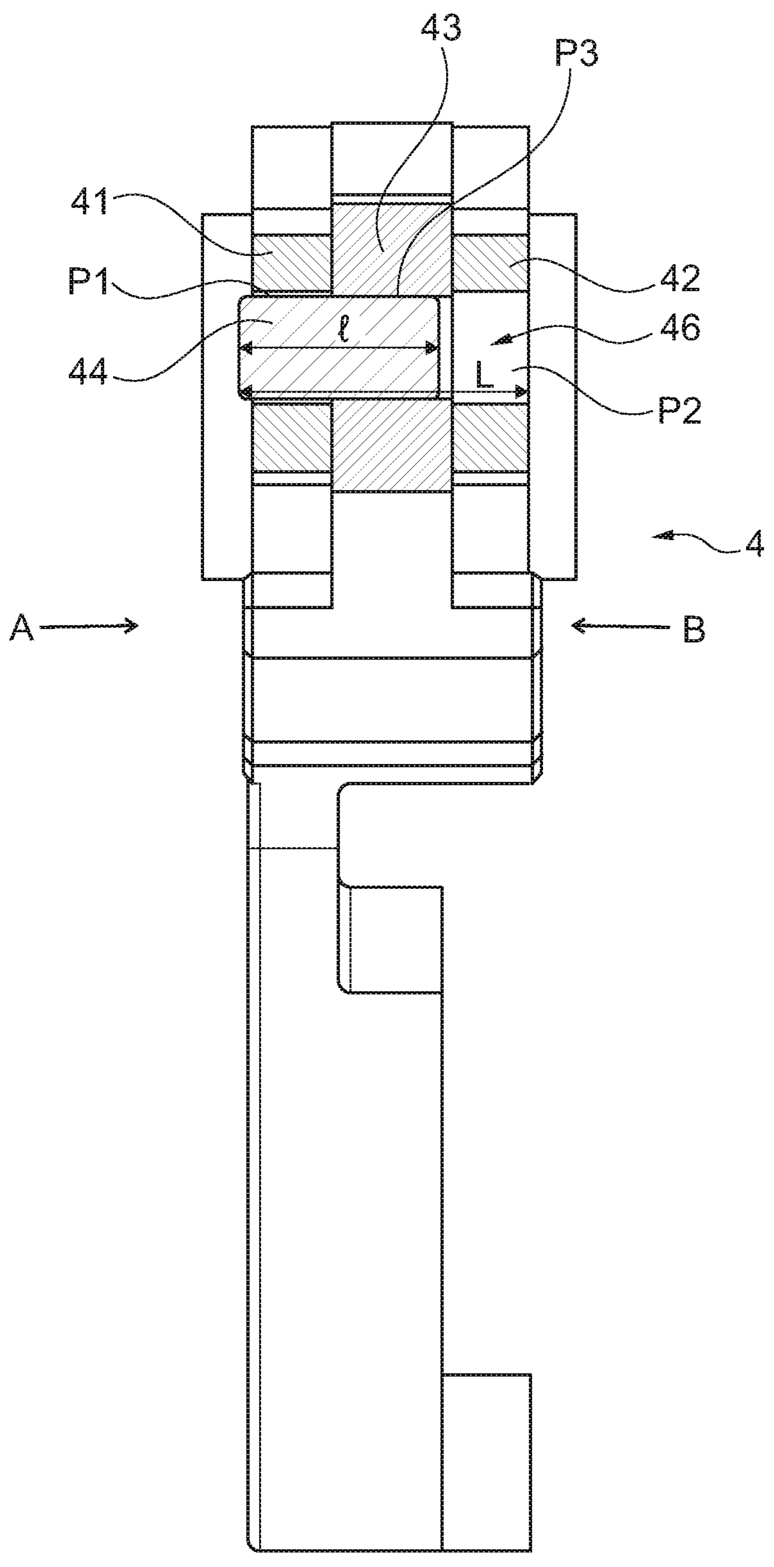

The invention will now be described in more detail with reference to the appended drawings, wherein FIG. 1 discloses a planar view from a first side of a locking device with arrangement for selecting an active side of a door according to the invention;

FIG. 2*a* discloses an exploded view of the arrangement of FIG. 1 from one perspective;

FIG. 2*b* discloses an exploded view of the arrangement of FIG. 1 from another perspective;

FIG. 3*a* discloses a planar view from the first side of the arrangement of FIG. 1 in a state where the bolt operating mechanism is not active;

FIG. 3*b* discloses a planar view from the first side of the arrangement of FIG. 1 when the bolt operating mechanism is active;

FIG. 3*c* discloses a planar view from the first side of the arrangement of FIG. 1 when the second handle receiving portion is rotated but not connected to the connector; and FIG. 4 discloses a cross-sectional view from a third side of the arrangement of FIG. 1, showing the channel and the actuator.

DETAILED DESCRIPTION

FIG. 1 discloses a preferred embodiment of a locking device 1 having a locking bolt 2 that in an extended state projects from the locking device in a first direction. When the locking device 1 is mounted in a door, the locking bolt 2 serves to keep the door closed and to prevent it from opening unless the locking bolt 2 is first retracted into the locking device 1 itself. The locking bolt 2 is operated by a bolt operating mechanism 3 that controls the position of the locking bolt 2. Such bolt operating mechanisms 3 and their interaction with the locking bolt 2 are well known within the art and can be varied within the scope of the appended claims. In the following, one embodiment of a locking device 1 will be disclosed in more detail, but the present invention itself is focused towards an arrangement 4 for selecting an active side of a door and it is especially to be noted that this arrangement 4 can be mounted in any locking device that has a mechanical bolt operating mechanism that control the position of a locking bolt. Hence, what is said herein with reference to the locking device and details of the configuration and operation of the locking bolt and bolt operating mechanism especially is to be seen as an example only, as is readily understood by the skilled person.

Thus, in FIG. 1, the locking bolt 2 is spring biased with a mechanical spring 21 towards its extended position and the bolt operating mechanism 3 acts to retract the locking bolt by forcing it against the spring 21. The bolt operating mechanism 3 comprises a lever 31 that is in one end rotatably arranged on a pivot 32 and that has an opening 33 into which a protrusion 22 on the locking bolt 2 extends so that a pivoting of the lever 31 about the pivot 32 will result in a longitudinal movement of the locking bolt 2. At another end of the lever 31 a contact surface 34 is provided and arranged to be contacted by a contact element 63 on an arrangement 4 for selecting an active side of the door that will be described in more detail below. The locking device 1 also comprises a housing 5 that encloses components of the device 1 and on which the components are preferably mounted. The locking bolt 2 extends through an opening in the housing 5 in its extended state.

To summarize, the bolt operating mechanism 3 in this preferred embodiment comprises a lever 31 having a contact surface 34 against which a contact element 63 can push to force the lever to rotate about the pivot 32, thereby causing a longitudinal movement of the locking bolt 2 that retracts the locking bolt 2 into the locking device 1 so that the door can be opened.

Apart from the components described above and the arrangement 4 that will be described below, the locking device may also comprise electrical means for controlling the locking bolt 2 and there may optionally also be additional bolts and additional functions that the locking device is able to perform.

FIG. 2*a* and FIG. 2*b* disclose the arrangement 4 for selecting an active side of the door, with a connector 43 on which the contact element 63 is mounted. A first handle receiving portion 41 is placed on the first side A of the connector and a second handle receiving portion 42 is placed on a second side B, and each of the first and second handle receiving portions 41, 42 comprises a central opening 48 into which a first and second handle (not shown) can be mounted when the locking device 1 is mounted in a door. A rotation of the first or second handle will therefore result in a corresponding rotation of the first or second handle receiving portion 41, 42.

The first and second handle receiving portions 41, 42 are placed into a central opening 64 in the connector 43, preferably separated by a spacer 61. A channel 46 is formed by through holes 46*a*, 46*b*, 46*c* in the first handle receiving portion 41, connector 43, and second handle receiving portion 42, respectively. An actuator 44 is placed inside the channel 46 and can slide along the channel 46 from a first position P1 where the actuator 44 is situated inside through holes 46*a*, 46*b* in the first handle receiving portion 41 and the connector 43, to a second position P2 where the actuator 44 is situated inside through holes 46*b*, 46*c* in the connector 43 and second handle receiving portion 42. The actuator 44 is preferably a pin. The actuator 44 can be fixated by a fastening device 45 that is applied to the actuator 44 from a third side C that is essentially perpendicular to the first and second sides A, B and that is therefore parallel or coinciding with the direction of movement of the locking bolt 2. The fastening device 45 is inserted through a channel opening 47 provided in the connector 43 so that a holding force from the fastening device 45 can act on the actuator 44 and hold the actuator 44 securely to prevent movement along the channel 46. In this embodiment the fastening device 45 is a screw with an external thread that is configured to cooperate with an internal thread in the channel opening 47 so that the holding force is created through screwing the screw into the channel opening 46. Alternatively, the fastening device 45 can be a mechanical spring that is inserted into the channel opening 47 and be fastened so that a biasing force from the spring acts on the actuator 44. Other types of fastening devices 45 may also be used, as long as they can act on the actuator 44 and prevent its movement.

FIG. 3*a* discloses the arrangement 4 for selecting an active side of the door in a planar view with the actuator 44 in the first position P1. The arrangement 4 is mounted in the locking device 1 and the fastening device 45 has been placed in the channel opening 47 to fixate the actuator 44 in the desired position. The housing 5 has an access opening 51 to allow adjustment of the fastening device 45 without opening the housing 5, making it possible for a person to easily change position of the actuator 44 in a time efficient way. Preferably, there is also an inspection opening (not shown) in the housing 5 aligned with the channel 46 so that visual inspection of the position of the actuator 44 is possible. Preferably, the channel 46 has closed ends to prevent removal of the actuator 44, preferably either by the housing abutting the first and second handle receiving portions 41, 42 or by the through holes 46*a*, 46*c* having a reduced diameter at their ends that face away from the connector 43 so that this reduced diameter is smaller than a diameter of the actuator 44 itself. Thereby, the actuator 44 is reliably kept inside the channel 46 when the arrangement 4 is in its mounted state.

In some embodiments, the second length l of the actuator 44 and the first length L of the channel 46 are adapted so that there is a third position P3 in which the actuator 44 is inside the through hole 46*b* in the connector 43 only so that neither the first nor the second handle receiving portions 41, 42 are connected to the connector 43. This third position P3 therefore means that none of the handles on the door has a mechanical connection to the bolt operating mechanism 3 and that mechanical opening of the door is therefore not possible. In such cases, either or both sides may have electrical connections to the bolt 2, as is well known in the art.

In order to hold the actuator 44 in either of the positions P1, P2, P3 in a reliable and well-defined way, the actuator 44 may comprise cavities or grooves for each position so that the fastening device 45 can fit at least partially into said cavities or grooves. This would both enable a secure holding of the actuator 44 and prevent unintentional sliding along the channel 46, and also make it evident to the person operating the fastening device 45 that a well-defined position of the actuator 44 has been achieved. Alternatively, one groove extending along the actuator 44 could be provided to enable a more secure mounting but without using grooves or cavities to define the positions P1, P2, P3.

FIG. 3*a* discloses the arrangement 4 in a mounted state, where the first handle receiving portion 41, the connector 43 and the second handle receiving portion 42 are aligned to form the channel 46. The actuator 44 is placed in the first position P1 and fixed by the fastening device 45 so that the first handle receiving portion 41 is connected to the connector 43 in such a way that a rotation of the first handle receiving portion 41 results in a corresponding rotation of the connector 43. Such a rotation is shown in FIG. 3*b*.

In FIG. 3*c*, the actuator 44 is in the second position P2 so that the second handle receiving portion 42 is connected to the connector 43. The first handle receiving portion 41 is not connected to the connector 43, and a rotation of said first handle receiving portion 41 that is shown in the figure does not therefore result in a corresponding rotation of the connector 43.

FIG. 4 discloses the arrangement 4 seen from the third side C with the channel 46 and with the actuator 44 in the first position P1. The second length l of the actuator 44 is smaller than the first length L of the channel 46 so that the actuator 44 only connects the first handle receiving portion 41 to the connector 43. The operation of the invention will now be described with reference to FIG. 1-3*c*.

The arrangement 4 together with other components of the locking device 1 are mounted as shown in FIG. 1 to form a locking device 1 as described above. It is to be noted that the components can have different appearance and shape than those shown in the drawings as long as their functions are the same.

Thus, the locking bolt 2, bolt operating mechanism 3 and arrangement 4 are mounted inside a housing 5 and the housing 5 is closed to prevent any component from coming loose, escaping from the housing 5 or move in such a way that their function is hindered. The housing 5 has a plurality of openings, most notably an opening to allow the locking bolt 2 to protrude in its extended state, but also the access opening 51 to enable access to the fastening device 45 and preferably one or two inspection openings provided on the first side A and/or the second side B and aligned with the channel 46 so that the position of the actuator 44 can be determined visually by looking into one of the inspection openings.

When the locking device 1 is to be mounted in a door leaf, it is decided which side of the door should be active, i.e. where the door handle should be mechanically connected to the locking bolt 2 in such a way that the locking bolt 2 is retracted through rotation of the door handle. If the first side A is to be active, the position of the actuator 44 is determined through inspection through the inspection opening or through removal of the fastening device 45 and inspection through the opening 47. If a change of position is desired, the locking device is turned with the first side A down so that the actuator 44 falls by gravity into the first position P1, or alternatively the actuator 44 is moved into the first position P1 by inserting an object such as a thin rod or wire into the opening 47 and pushing the actuator 44 in a direction towards the first side A until the first position P1 is reached. Alternatively, the actuator 44 can be moved into position by using a magnet held at one end of the channel 46 that attracts the actuator 44, or as another alternative an adjustment element can be inserted through the opening 47 and cooperate with a groove on the actuator 44 to move the actuator 44 by screwing or the like. The fastening device 45 can serve as adjustment element or alternatively the adjustment element can be a separate component.

Then the fastening device 45 is used to fixate the actuator 44 as described above. The locking device is then ready for mounting in the door.

After door handles have been added and connected to the first and second handle receiving portions 41, 42, the locking device 1 is ready for use. When the door is closed and the locking bolt 2 is extended, a rotation of the handle on the first side A will result in a rotation of the first handle receiving portion 41 and a corresponding rotation of the connector 43, that allows the bolt operating mechanism 3 to be operated to retract the bolt 2. When the handle is released, the locking bolt 2 is allowed to return to the extended position and the connector 43, first handle receiving portion 41 and handle are also allowed to return to a rest position. The rest position of the arrangement 4 is shown in FIG. 1 and in FIG. 3*a*.

When the door handle on the second side B is rotated, a rotation of the second handle receiving portion 42 is generated by since no connection is established to the connector 43 there is no corresponding rotation of the connector 43 and therefore also no operation of the bolt operating mechanism 3. The locking bolt 2 is maintained in the extended position and the door cannot be opened. Of course, there may be additional mechanisms in the locking device 1 such as an electrical of magnetic connection between the handle on the second side B and the locking bolt 2 so that operating the door handle will nevertheless allow for the locking bolt 2 to be retracted, but such mechanisms are not described herein and there is in such cases still no purely mechanical connection that allows for opening the door by operating the handle on the second side B.

If instead the second side B is to be the active side of the door, the locking device 1 is removed from the door leaf and the actuator 44 is moved into the second position P2 by loosening the fastening device 45 and either turning the locking device with the second side B facing downwards so that the actuator 44 is moved into the second position by gravitational force or alternatively the actuator 44 is moved into the second position by manipulating by means of an object inserted through the opening 47 or through the inspection opening on the first side A, if desired. After re-fastening the fastening device 45 the actuator 44 is fixated in the second position P2 and the locking device 1 can be mounted in the door again. Now, the second side B is the active side and a rotation of the handle on the second side B will result in a mechanical operation of the locking bolt so that the door can be opened. Similarly, using the door handle on the first side A will not result in an opening of the door since there is now no connection between the first handle and the bolt operating mechanism 3 via the connector 43.

If for some reason it is desired that none of the first and second sides A, B should be active, the actuator 44 can be moved into the third position P3 and be fixed there by means of the fastening device 45. This results in both the handle on the first side A and the handle on the second side B being disconnected from the connector 43 so that the door cannot be opened from either side. In such cases is could be desired that only an electronic or magnetic connection should be used and it can be decided that either side or both should be connected in such a way. This is well known within the art and will not be described herein.

Another way of achieving the result that none of the first and second sides A, B should be active would be to dismantle the locking device 1 and remove the actuator 44 altogether.

The actuator 44 must be able to withstand large shearing forces without breaking to ensure that the failsafe mechanical connection between one of the handle receiving portions 41, 42 and the connector 43 is maintained even if the handle is subjected to a large force. Such force may arise if the handle is forced downwards, and if the actuator 44 is not able to withstand damage or even breakage may occur. It is therefore a significant advantage if the actuator 44 is a pin rather than a screw, since the pin is able to resist shearing forces better and can be made from a more durable hardened steel material that would be unsuited to a screw due to the external thread along the screw. One suitable material for the pin would be DIN 6325 (ISO 8735) that has a hardness of 550-650 HV 30. The actuator 44 should preferably be able to withstand shearing forces that are larger than 40 Nm, more preferably larger than 60 Nm, and this is generally not possible if the actuator were a screw, especially since available space inside the housing 5 require that dimensions of the actuator 44 are kept small. Preferably, the diameter of the actuator 44 is less than 6 mm, more preferably less than 5 mm and even more preferably about 4 mm.

The fastening device 45 may advantageously be a screw, since it is not subjected to large shearing forces. The diameter of the fastening device 45 is preferably the same as the dimension of the actuator 44 mentioned above, and a screw used as fastening device 45 should preferably have a material strength according to SS-EN ISO 898-1:2013.

An additional advantage of the present invention is that the locking device 1 is secure against attempts to open the door by forcing the activation of one of the handles by manipulating the actuator 44 when the locking device 1 is mounted in a door. Even if an unauthorized person should break the door to expose the first or second side A, B of the locking device 1, pushing against the actuator 44 through the inspection opening, for instance by inserting a thin rod or wire, would only result in the side facing away from the unauthorized person becoming or remaining active. It would not be possible to activate the side facing towards the person by force in this way. Instead, the locking device 1 would have to be removed from the door to expose the third side C so that the fastening device 45 can be loosened, and this is generally not possible when the locking device 1 is mounted in the door and the locking bolt 2 is extended.

It is to be noted that features from the various embodiments described herein may freely be combined, unless it is explicitly stated that such a combination would be unsuitable. The dimensions and proportions of the locking device and its components may also be varied as is suitable for a particular application, and the shape and form of each part of the locking device and the arrangement may also be varied as long as their functions and interaction remain the same.

The invention claimed is:

1. Locking device (1) with an arrangement (4) for selecting an active side of a door, the locking device (1) comprising a first side (A) configured to face a first side of the door and a second side (B) configured to face a second side of the door when the locking device (1) is mounted in the door, a bolt (2) configured to move between an extended position and a retracted position, said movement being in a direction parallel to the first side (A) of the locking device (1) and the second side (B) of the locking device (1), and a bolt operating mechanism (3) configured to control a position of the bolt (2), and the arrangement (4) comprising a first handle receiving portion (41) arranged on the first side (A) of the locking device, and configured to rotate when a first handle is operated, a second handle receiving portion (42) arranged on the second side (B) of the locking device, and configured to rotate when a second handle is operated, wherein the first handle receiving portion (41) and the second handle receiving portion (42) are configured to move independently of each other;

the arrangement (4) also comprising a connector (43) configured to transmit a movement from the first handle receiving portion (41) or the second handle receiving portion (42) to the bolt operating mechanism (3) of the locking device (1);

an actuator (44) movable from a first position, in which it connects the first handle receiving portion (41) to the connector (43) to a second position in which it connects the second handle receiving portion (42) to the connector (43), so that a rotation of the first handle receiving portion (41) or second handle receiving portion (42) is configured to generate a movement of the bolt (2);

and a fastening device (45) configured to fixate the actuator (44) in the first position or the second position, such that either the first handle receiving portion (41) or the second handle receiving portion (42) is coupled to the connector (43) and in turn the bolt operating mechanism (3) and the bolt (2) to operate the bolt (2), wherein the fastening device (45) is configured to be accessible from only a third side (C) of the locking device opposite a face plate through which said bolt (2) extends and retracts, said third side (C) being essentially perpendicular to the first and second sides (A, B), and parallel to said opposite face plate.

2. Locking device with arrangement for selecting an active side of a door according to claim 1, wherein the locking device (1) further comprises a housing (5), said housing (5) having an opening (51) on the third side (C) in which the fastening device (45) is inserted.

3. Locking device with arrangement for selecting an active side of a door according to claim 2, wherein the housing (5) has at least one inspection opening for determining a position of the actuator (44).

4. A locking device (1) with an arrangement (4) for selecting an active side of a door, the locking device (1) comprising a first side (A) configured to face a first side of the door and a second side (B) configured to face a second side of the door when the locking device (1) is mounted in the door, a bolt (2) configured to move between an extended position and a retracted position, said movement being in a direction parallel to the first side (A) of the locking device (1) and the second side (B) of the locking device (1), and a bolt operating mechanism (3) configured to control a position of the bolt (2), and the arrangement (4) comprising a first handle receiving portion (41) arranged on the first side (A) of the locking device, and configured to rotate when a first handle is operated, a second handle receiving portion (42) arranged on the second side (B) of the locking device, and configured to rotate when a second handle is operated, wherein the first handle receiving portion (41) and the second handle receiving portion (42) are configured to move independently of each other;

the arrangement (4) also comprising a connector (43) configured to transmit a movement from the first handle receiving portion (41) or the second handle receiving portion (42) to the bolt operating mechanism (3) of the locking device (1);

an actuator (44) movable from a first position, in which it connects the first handle receiving portion (41) to the connector (43) to a second position in which it connects the second handle receiving portion (42) to the connector (43), so that a rotation of the first handle receiving portion (41) or second handle receiving portion (42) is configured to generate a movement of the bolt (2); and a fastening device (45) configured to fixate the actuator (44) in the first position or the second position, the fastening device (45) is configured to be accessible from a third side (C) of the locking device, said third side (C) being essentially perpendicular to the first and second sides (A, B), and the actuator (44) is a pin and the first handle receiving portion (41), second handle receiving portion (42) and the connector (43) each comprise a through hole (46*a*, 46*c*, 46*b*), said through holes (41*a*, 41*c*, 41*b*) being aligned to form a channel (46) in which the pin is movably arranged.

5. Locking device with arrangement for selecting an active side of a door according to claim 4, wherein the channel (46) has a first length (L) and the pin has a second length (l), said second length (l) being smaller than the first length (L) so that the pin in the first position (P1) rests in the through holes (46*a*, 46*b*) of the first handle receiving portion (41) and the connector (43) but not in the through hole (46*b*) of the second handle receiving portion (42), and so that the pin in the second position (P2) rests in the through holes (46*b*, 46*c*) of the second handle receiving portion (42) and the connector (43) but not in the through hole (46*a*) of the first handle receiving portion (41).

6. Locking device with arrangement for selecting an active side of a door according to claim 4, wherein the channel (46) has closed ends configured to prevent the pin from leaving the channel (46), the closed ends preferably being formed by end portions of the channel (46) having a smaller diameter than a diameter of the pin.

7. Locking device with arrangement for selecting an active side of a door according to claim 6, wherein at least one of the closed ends comprises an inspection opening for determining the position of the pin.

8. Locking device with arrangement for selecting an active side of a door according to claim 4, wherein the actuator (44) comprises at least one cavity or groove into which the fastening device (45) extends when fixating the actuator (44).

9. Locking device with arrangement for selecting an active side of a door according to claim 8, wherein the actuator (44) comprises one cavity or groove for each of the positions (P1, P2, P3).

10. Locking device with arrangement for selecting an active side of a door, the locking device (1) comprising a first side (A) configured to face a first side of the door and a second side (B) configured to face a second side of the door when the locking device (1) is mounted in the door, a bolt (2) configured to move between an extended position and a retracted position, said movement being in a direction parallel to the first side (A) of the locking device (1) and the second side (B) of the locking device (1), and a bolt operating mechanism (3) configured to control a position of the bolt (2), and the arrangement (4) comprising a first handle receiving portion (41) arranged on the first side (A) of the locking device, and configured to rotate when a first handle is operated, a second handle receiving portion (42) arranged on the second side (B) of the locking device, and configured to rotate when a second handle is operated, wherein the first handle receiving portion (41) and the second handle receiving portion (42) are configured to move independently of each other;

the arrangement (4) also comprising a connector (43) configured to transmit a movement from the first handle receiving portion (41) or the second handle receiving portion (42) to the bolt operating mechanism (3) of the locking device (1);

an actuator (44) movable from a first position, in which it connects the first handle receiving portion (41) to the connector (43) to a second position in which it connects the second handle receiving portion (42) to the connector (43), so that a rotation of the first handle receiving portion (41) or second handle receiving portion (42) is configured to generate a movement of the bolt (2);

and a fastening device (45) configured to fixate the actuator (44) in the first position or the second position, such that either the first handle receiving portion (41) or the second handle receiving portion (42) is coupled to the connector (43) and in turn the bolt operating mechanism (3) and the bolt (2) to operate the bolt (2), wherein the fastening device (45) is configured to be accessible from a third side (C) of the locking device, said third side (C) being essentially perpendicular to the first and second sides (A, B), and further comprising a third position (P3) of the actuator (44) in which neither the first handle receiving portion (41) nor the second handle receiving portion (42) is connected to the actuator (44), said third position (P3) being between the first and second positions (P1, P2).

11. Locking device with arrangement for selecting an active side of a door, the locking device (1) comprising a first side (A) configured to face a first side of the door and a second side (B) configured to face a second side of the door when the locking device (1) is mounted in the door, a bolt (2) configured to move between an extended position and a retracted position, said movement being in a direction parallel to the first side (A) of the locking device (1) and the second side (B) of the locking device (1), and a bolt operating mechanism (3) configured to control a position of the bolt (2), and the arrangement (4) comprising a first handle receiving portion (41) arranged on the first side (A) of the locking device, and configured to rotate when a first handle is operated, a second handle receiving portion (42) arranged on the second side (B) of the locking device, and configured to rotate when a second handle is operated, wherein the first handle receiving portion (41) and the second handle receiving portion (42) are configured to move independently of each other;

the arrangement (4) also comprising a connector (43) configured to transmit a movement from the first handle receiving portion (41) or the second handle receiving portion (42) to the bolt operating mechanism (3) of the locking device (1);

an actuator (44) movable from a first position, in which it connects the first handle receiving portion (41) to the connector (43) to a second position in which it connects the second handle receiving portion (42) to the connector (43), so that a rotation of the first handle receiving portion (41) or second handle receiving portion (42) is configured to generate a movement of the bolt (2);

and a fastening device (45) configured to fixate the actuator (44) in the first position or the second position, such that either the first handle receiving portion (41) or the second handle receiving portion (42) is coupled to the connector (43) and in turn the bolt operating mechanism (3) and the bolt (2) to operate the bolt (2), wherein the fastening device (45) is configured to be accessible from a third side (C) of the locking device, said third side (C) being essentially perpendicular to the first and second sides (A, B), and the fastening device (45) is configured to fixate the actuator (44) by a holding force against the actuator (44), said holding force being essentially perpendicular to a direction from the first position (P1) of the actuator (44) to the second position (P2) of the actuator (44).

12. Locking device with arrangement for selecting an active side of a door according to claim 11, wherein the fastening device (45) is a screw and the holding force is created by the screw having an external thread configured to cooperate with an internal thread of a hole (47) in which the screw is arranged.

13. Locking device with arrangement for selecting an active side of a door according to claim 11, wherein the fastening device (45) is a spring and the holding force is created by the spring being biased towards the actuator (44).

* * * * *